United States Patent [19]

Smith

[11] 4,021,180
[45] May 3, 1977

[54] COLLAPSIBLE CORE

[75] Inventor: Wendal I. Smith, Seymour, Ind.

[73] Assignee: Standard Oil Company (Indiana), Chicago, Ill.

[22] Filed: Apr. 14, 1976

[21] Appl. No.: 677,067

Related U.S. Application Data

[63] Continuation of Ser. No. 535,119, Dec. 20, 1974, abandoned.

[52] U.S. Cl. .............................. 425/392; 425/403; 249/180; 249/184; 425/DIG. 218
[51] Int. Cl.² .................. B29C 17/00; B29D 23/00
[58] Field of Search ......... 425/DIG. 221, DIG. 227, 425/DIG. 14, 247, 248, 249, 256, 258, 242 R, 262, 393, 392, DIG. 209, DIG. 211, 403, 469, DIG. 5, 438, DIG. 218; 249/59, 178, 180, 184, 186

[56] References Cited

UNITED STATES PATENTS

| | | | |
|---|---|---|---|
| 3,205,535 | 9/1965 | Niessner et al. | 425/392 X |
| 3,247,548 | 4/1966 | Fields et al. | 425/438 |
| 3,248,756 | 5/1966 | Mills et al. | 425/392 |
| 3,310,620 | 3/1967 | Martelli et al. | 425/DIG. 211 |
| 3,339,242 | 9/1967 | Lamb | 249/180 X |
| 3,484,900 | 12/1969 | Sands et al. | 425/393 |
| 3,677,684 | 7/1972 | Platz | 425/469 X |
| 3,732,054 | 5/1973 | Lyng | 425/393 |
| 3,737,271 | 6/1973 | Novak | 425/DIG. 5 |
| 3,779,688 | 12/1973 | Jullien-Davin | 425/DIG. 5 |
| 3,784,346 | 1/1974 | Moroschak | 425/DIG. 211 |
| 3,859,025 | 1/1975 | Maroschak | 425/DIG. 211 |
| 3,940,227 | 2/1976 | Strasser | 249/180 X |
| 3,960,472 | 6/1976 | O'Connor et al. | 425/393 |
| 3,966,385 | 6/1976 | Spears | 425/393 |

Primary Examiner—J. Howard Flint, Jr.
Attorney, Agent, or Firm—Stanley M. Welsh; Arthur G. Gilkes; William T. McClain

[57] ABSTRACT

Collapsible core assembly having retractable portion capable of producing plastic parts having an undercut. The core assembly comprises a segmented portion operably connected to an innercore pulling assembly whereby operation of the innercore pulling assembly first retracts the segmented core and thereafter pulls the complete core assembly out of the molded part.

6 Claims, 10 Drawing Figures

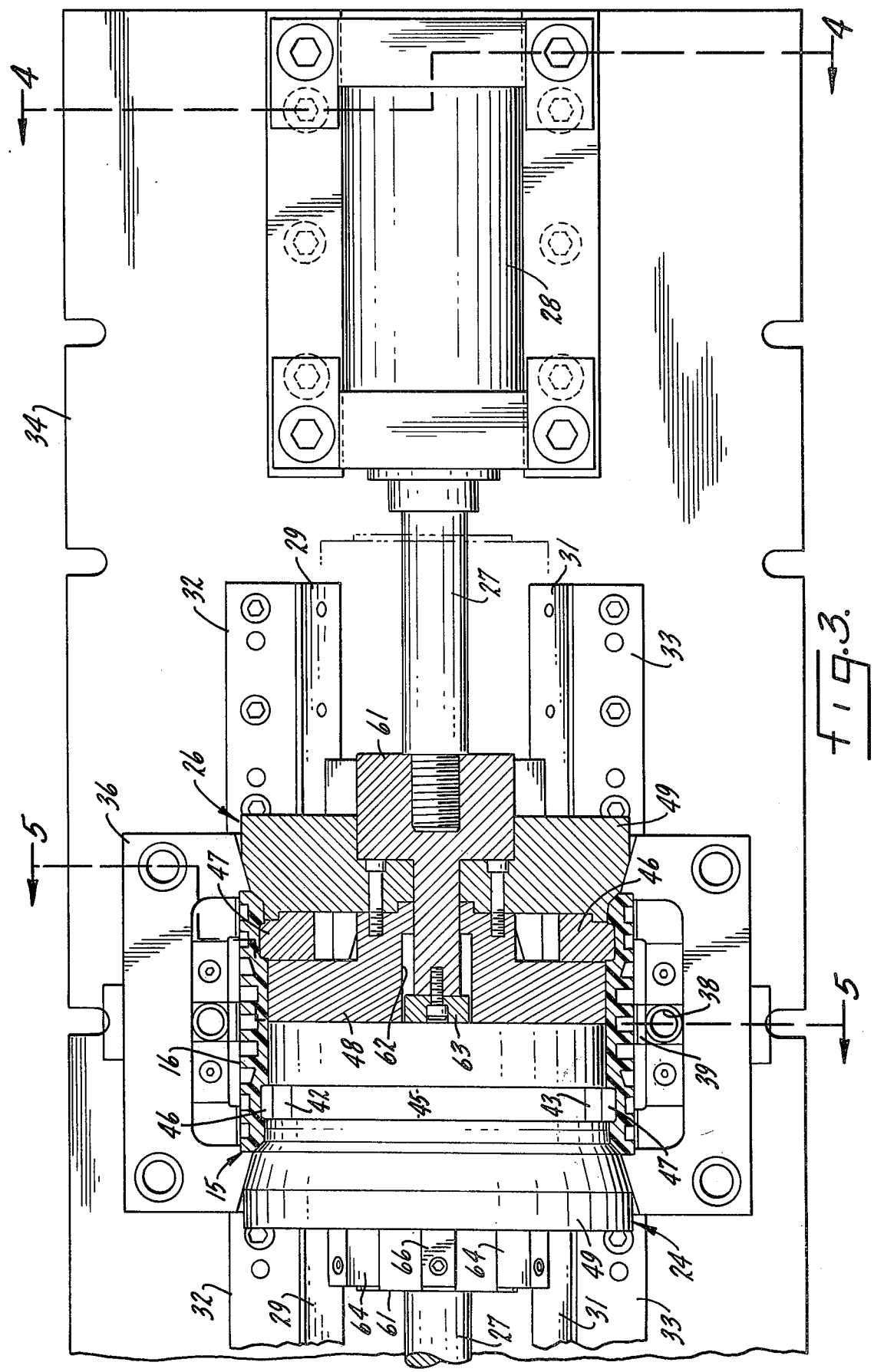

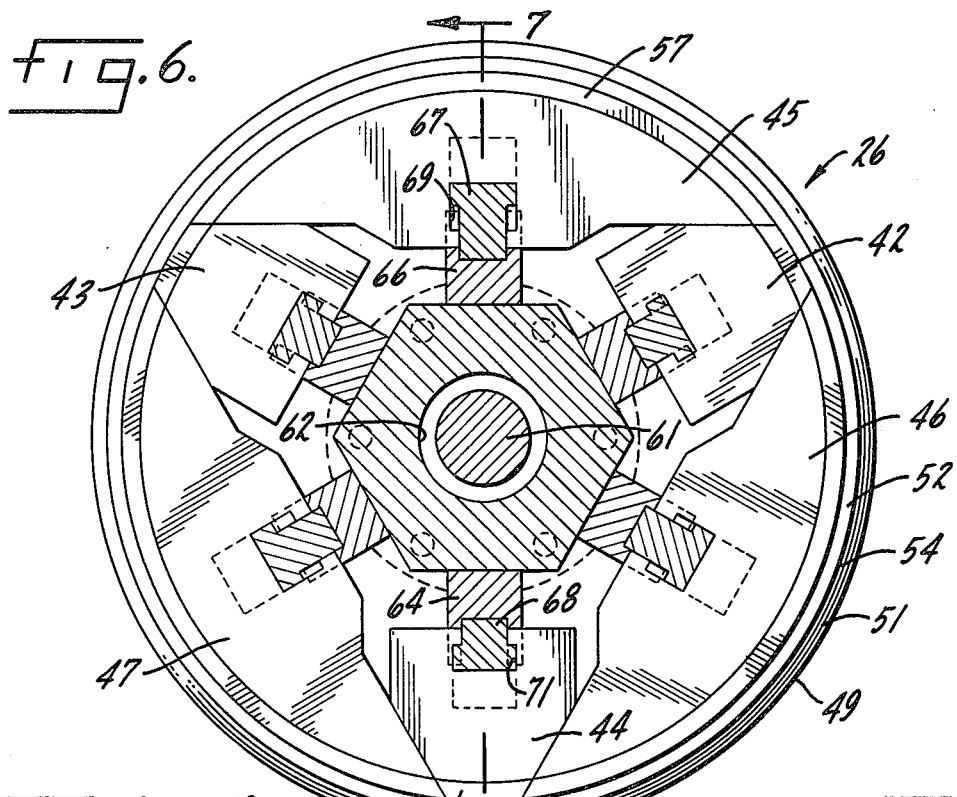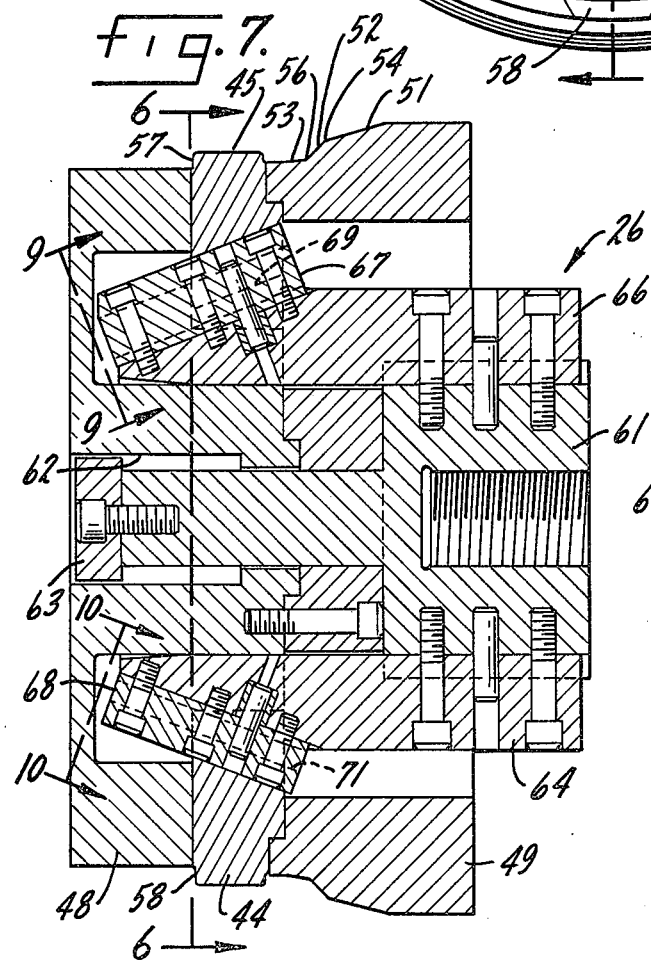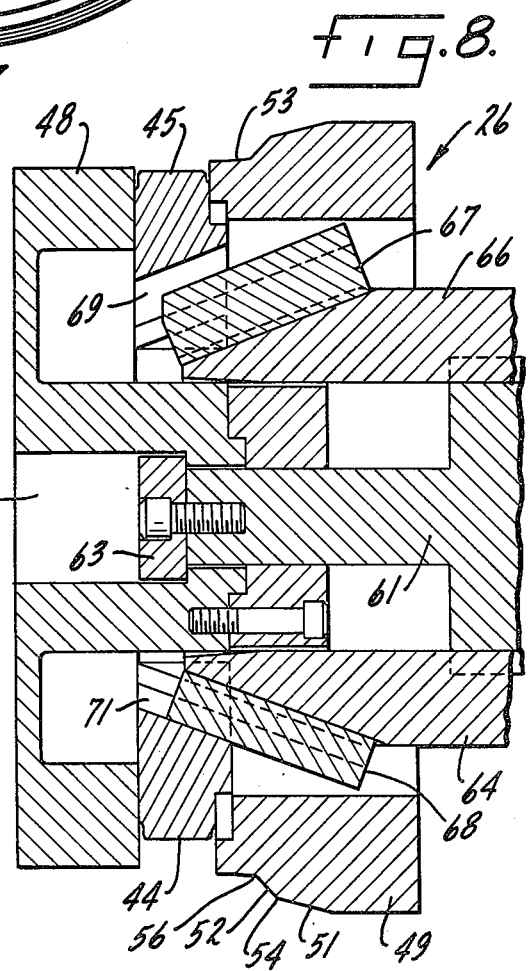

COLLAPSIBLE CORE

This is a continuation of application Ser. No. 535,119, filed Dec. 20, 1974, now abandoned.

BACKGROUND OF THE INVENTION

1. Field of the Invention

This invention relates to plastic molding apparatus whereby a part can be made with an undercut or threaded section. Similar tooling has been developed but this invention is believed to provide apparatus with more positive use and which requires reduced maintenance.

2. Description of the Prior Art

An example of the prior art is Fields et al. U.S. Pat. No. 3,247,548 (1968) wherein resilient mounted molding members are used. Another prior art device provides a collapsible core by providing helically grooved operating members capable of expanding a core element by rotary movement of an innercore member. Such rotary action results in excessive stress in shear on the actuating members.

SUMMARY OF THE INVENTION

I have provided a collapsible core assembly capable of providing a 360° undercut in a molded plastic part. The system operates by simple axial movement of the core, the first action being retraction of circular segments in timed relationship followed by retraction of the core from the molded plastic part. This will provide apparatus by which an internal thread can be formed in a part followed by mold removal by simple axial movement rather than more complicated rotational movement. In another system the collapsible core assembly can be used to provide a plastic part with a 360° recess for the insertion of a preformed gasket. Such parts are used in the joining of pipe.

BRIEF DESCRIPTION OF THE DRAWING

In the Drawing:

FIG. 3 is a top view of the molding system of my invention with the upper mold removed and the right hand collapsible core assembly shown in section.

FIG. 6, a section view taken on line 6—6 of FIG. 7 shows the collapsible core segments and the operating means therefor.

FIG. 7, is a view taken on line 7—7 of FIG. 6 showing the collapsible core assembly in the molding position with the retractable segments extended.

FIG. 8 corresponds to FIG. 7 but shows the collapsible core assembly with the retractable segments in the retracted position.

DESCRIPTION OF THE INVENTION

Figure 1:
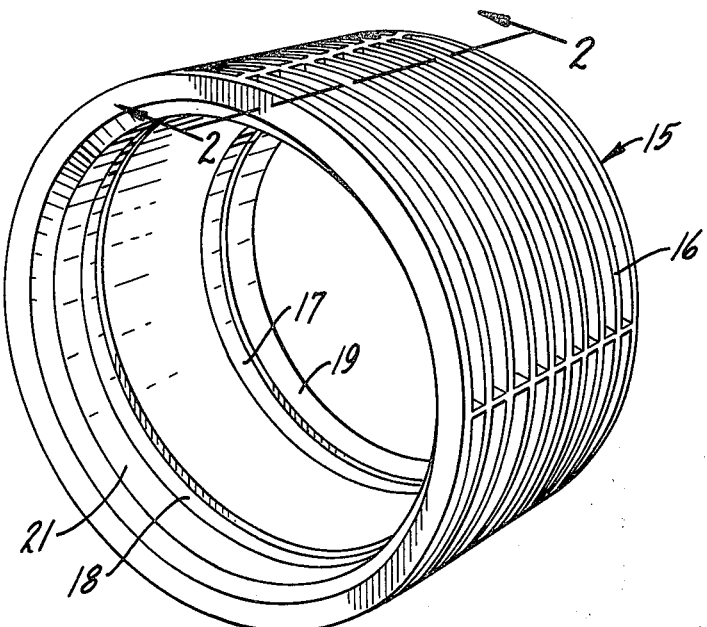
FIG. 1 is a perspective view of a coupling which can be produced using the collapsible core assembly of my invention.
Figure 2:
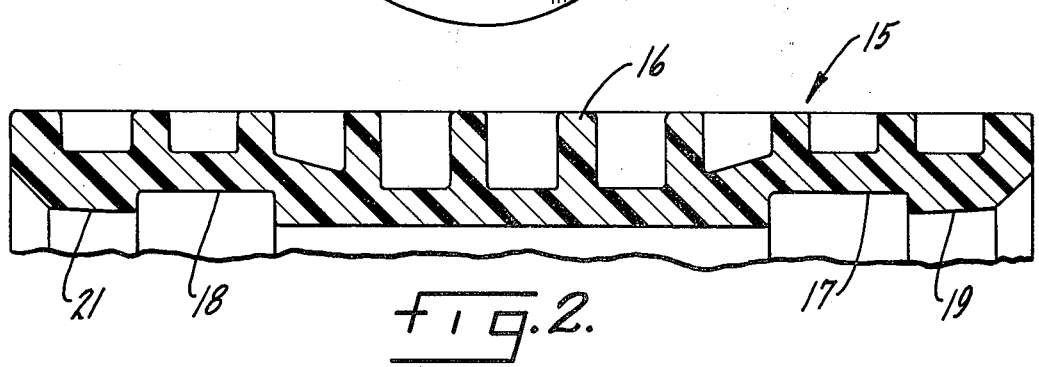
FIG. 2 is an enlarged sectional view on line 2—2 of FIG. 1.
Figure 4:
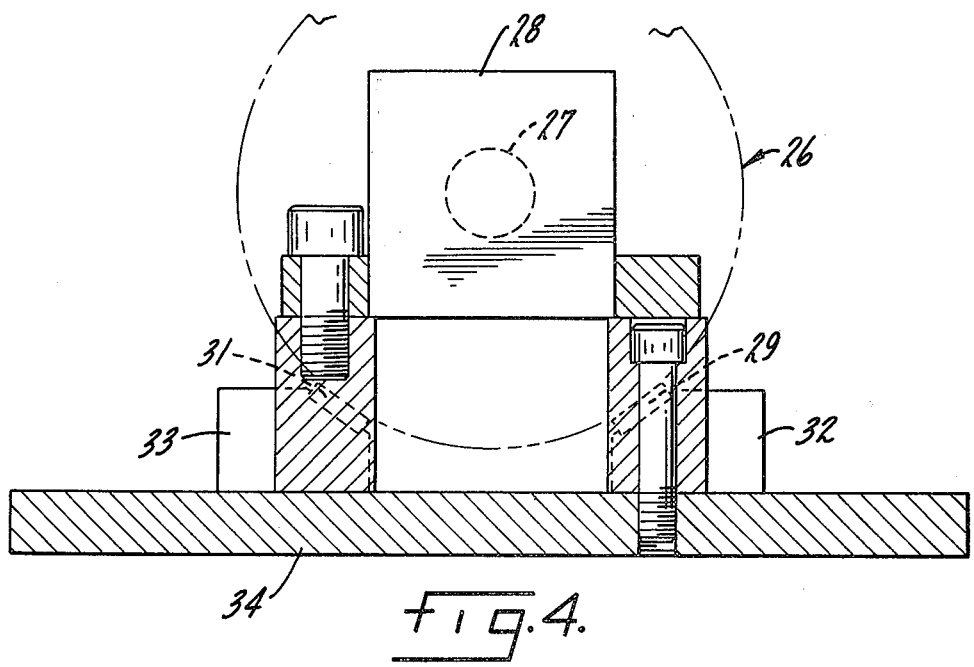
FIG. 4 is a section taken on line 4—4 of FIG. 3.

Broadly, my invention resides in a collapsible core assembly capable of forming a plastic part having at least one open end and an internal surface wherein projections extending completely around said inner surface are of a diameter larger than a second portion of said internal surface nearer the open end comprising:

1. an outer assembly adapted to form the internal surface of said plastic part comprising;
   a. first mold means 48 having suitable dimension to form the open end, and
   b. second mold means 42–47 having in a first position projecting parts to form said second portion of said internal surface and in a second position an outer circumference less than the second portion of said inner surface, and
2. a single bidirectional inner core pulling assembly movable axially of said outer assembly, and
   a. means in said pulling assembly to move said second mold means from said first position to said second position.

In a further aspect, my invention comprises a collapsible core assembly capable of forming a plastic part having a first inner perimeter, a second part having a second inner perimeter and, between said first and second parts, third part having a third inner perimeter, said third perimeter being larger than at least said second perimeter, said core assembly comprising:

1. an outer assembly adapted to form the inside surface of said plastic part comprising from front to back in the longitudinal direction; of said cap 48 and base 49 of said mold sections the inner ends of said mold segments sloping inwardly toward the center line of the assembly from the base to the cap, said mold segments having a T-shaped keyway 69 and 71 on the inner end thereof, said plurality of coplanar mold segments comprising:
   i. three small segments 42, 43, and 44 equidistantly placed around the circumference of said plurality, and
   ii. three large segments 45, 46, and 47 positioned between said small segments, and
2. a single bidirectional inner core pulling assembly movable axially of said core assembly comprising:
   a. a central core element 61 adapted to travel within and extend rearwardly beyond said counter base in said cap,
   b. a travel stop 63 on the forward end of said central core element 61 adapted to move within said counterbase 48 between the forward end of the counterbase and the rearward end thereof,
   c. an outer core element fixedly attached to said central core element,
   d. six actuators 64 and 66 fixedly attached to the forward end of said inner core element, sloping radially inwardly toward the center line of the assembly from the rear to the forward ends thereof, each of said actuators having a T-shaped projection 67 and 68 on the radially outer surface thereof adapted to inneract with the T-shaped keyway on the retractable mold segments, said T-shaped keyways 69 and 71 in said segments being of two dimensions wherein;
      a. first mold means 48 having said first inner perimeter,
      b. second mold means 49 having said second inner perimeter, and
      c. third mold means 42–47 having in a first position said third inner perimeter and in a second position a perimeter less than said second perimeter said third mold means being positioned between said first 48 and second 49 mold means said third mold means having a plurality of coplanar retractable segments 42–47, and 2. a bidirectional inner core pulling assembly movable axially of said outer assembly, and
    a. means in said pulling assembly to retract positively said third mold means to said perimeter less than second perimeter.

In a still further aspect, the invention comprises a collapsible core assembly capable of forming a 360° recess on the inside diameter of a plastic part having a central portion and a base portion on first and second sides of said recess comprising:
1. an outer assembly adapted to form the inside surface of said plastic part comprising from front to back in the longitudinal direction;
    a. a forward end cap 48 so shaped as to form the central portion of said platic part provided with an axial counterbase,
    b. a rearward base 49 so shaped as to form the outer end of said plastic part,
    c. a plurality of radially and coplanarly retractable mold segments 42–47 positioned between said cap 48 and base 49 which in the molding position provide a mold diameter of greater diameter than adjacent surfaces
        i. first actuators 64 associated to inneract with said small segments 42, 43, and 44 have the relationship between the projection 68 therein and the keyways 71 on the mold segments such that contact therebetween occurs substantially immediately upon rearward movement of said inner core pulling assembly, and
        ii. actuators 66 associated to inneract with said large segments 45, 46, and 47 have the relationship between the projections 67 therein and the keyways 69 on the mold segments such that contact therebetween occurs a substantial time after contact has been made between first actuators 64 and small mold segments 42, 43, and 44 upon rearward movement of said inner core pulling assembly.

To fully understand my invention, attention is now directed to the drawing. FIG. 1 shows a perspective view of a plastic coupling 15 which can be made using the collapsible core assembly of my invention. This coupling contains a plurality of ribs 16 which are made by conventional molding techniques. The novel feature of this part resides in the 360° recesses 17 and 18. When these recesses are provided with flexible gaskets, the coupling can be used to join lengths of pipe. Obviously, such a part could not be made by using a solid core because the portion of the core forming the recesses could not be removed. More specifically, outer ledges 19 and 21, being of smaller diameter than recesses 17 and 18, would prevent removal of the core. As will be apparent from the description which follows, two collapsible core assemblies are used in forming coupling 15, one extending into one end of the coupling end the other extending into the other end.

FIG. 3 shows the mold with the cover (not shown) removed and identical left hand collapsible core element 24, shown in full, and right hand collapsible core element 26 shown in section. Both core elements are in position for the production of the coupling by injection of molten plastic, i.e., with the collapsible mold segments in the extended position. The part shown will be more fully understood upon reference to FIG. 6–8 to be subsequently described.

The operation of both collapsible core assemblies is identical and is symetrical on both sides of the parting line between core assemblies 24 and 26. For this reason FIG. 3 illustrates only the operating mechanism for right hand core element 26. Collapsible core assembly 26 is mounted upon rod 27 which is connected to conventional hydraulic cylinder 28 for movement in a reciprocating manner. When so moving, the core section rides upon slides 29 and 31. Slides 29 and 31 are mounted respectively, on supports 32 and 33 which, in turn, are fastened to base plate 34 of the molding machine.

Figure 5:
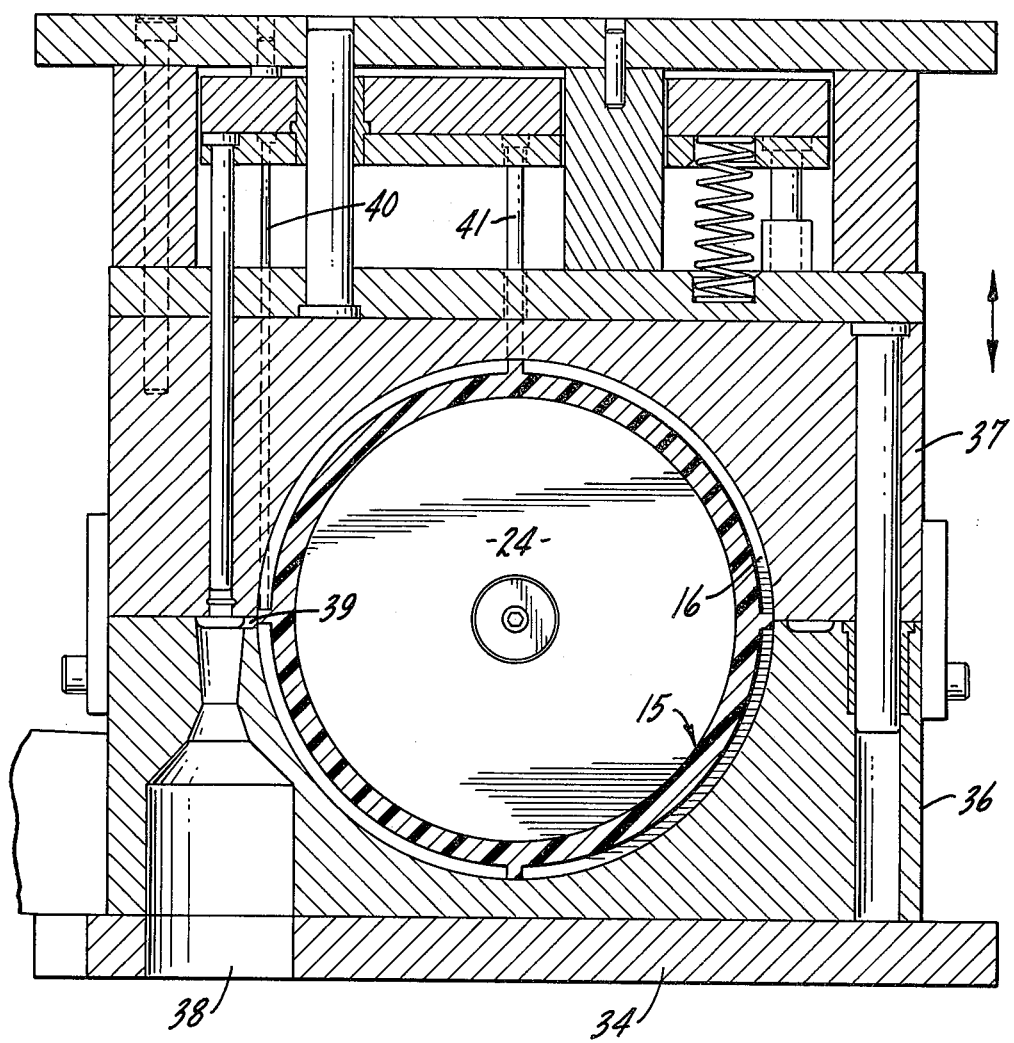
FIG. 5 is a section taken on line 5—5 of FIG. 3 showing principally the end of the left hand collapsible core assembly.
Figure 9:
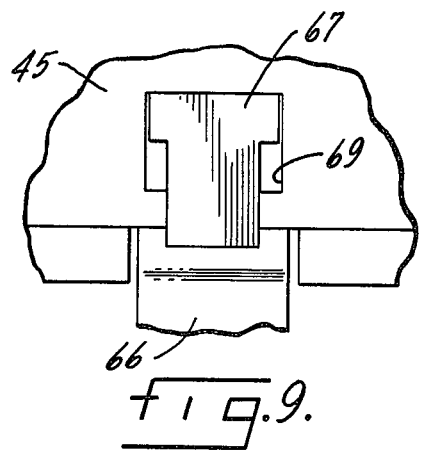
FIGS. 9 and 10 show, in plan, the ends of each type of actuators. Taken on lines 9—9 and 10—10 of FIG. 7.
Figure 10:
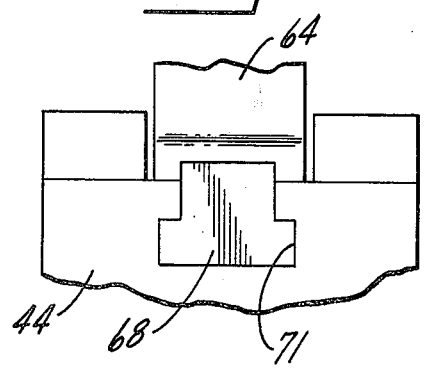

FIG. 5, shows a plan view on line 5—5 of FIG. 3 showing the molding apparatus of this invention and in particular the end view of collapsible core 24. Except for this collapsible core, the features shown are conventional and include the lowe outer mold form 36 and the upper mold 37. Plastic supply conduit 38 is connected to gate 39 through which the plastic is injected into the mold. Conventional ejector pins 40 and 41 are provided to eject the part from the mold upon upward movement of mold section 37.

The above description sets forth the major components used to produce the part with the 360° recess and attention is now directed to FIGS. 6, 7 and 8 which most clearly illustrate the novel features of my invention. FIGS. 6 and 7 show the collapsible assembly core with a plurality of retractable mold segments in the extended or molding position. The mold segments comprise small segments 42, 43 and 44 and large segments 45, 46 and 47. These retractable mold segments are positioned between a forward end cap 48 and a rearward base 49. In the particular design shown, this rearward base is so designed to provide a generally funnel shaped entrance into the part with a first sloping section 51. a second sloping section 52, and a third section generally parallel to the axis of the part 53. I have identified the junctions between portions 51, 52 and 53 as junctions 54 and 56.

All of retractable segments have a small undercut on the outer end thereof. This surface is indicated as 57 on large segment 45 and as 58 on small segment 44. Cap 48 and base 49 act as guides and retainers for the segments.

Central core element 61 is provided with a counterbore 62 in which moves travel stop 63. Bolted to central core element 61 are actuators 64 and 66, each of said actuators being provided with a T-shaped projection 67 and 68. This projection rides in a keyway on the segment, the keyway 69 being provided in movable segment 45 and keyway 71 being provided in small segment 44.

In operation, the hydraulic cylinder, after the cooling cycle, starts to move center core element 61 from the position shown in FIG. 7 toward that shown in FIG. 8. Since T-shaped projection 68 and actuator 64 fits snugly in keyway 71, small segment 44 starts to retract as soon as central core element 61 begins to move to the right. A short time after this movement has begun, the keyway 69 on actuator 66 contacts the T-shaped projection on said actuator and large segment 45 begins to retact.

In one specific model of this apparatus, the keyway and projection associated with the small segments was 0.375 inch while the space to the projection on the actuator associated with the large segments was 0.687 inch. Thus, the large segments do not start to move for the 5/16 inch difference between these figures. When the travel stop 63 contacts the end of counterbore 62, the retractable segments are in the fully retracted position shown in FIG. 8. While I have described the retraction by the inneraction of the T-shaped projection on actuator 64 for the small segment 44, it will be obvious that a similar action retracts small segments 42 and 43. Likewise, the operation of large segment 45 is duplicated by large segments 46 and 47.

When the apparatus has reached the position shown in FIG. 8, continued movement of central core element 61 to the right withdraws the complete core assembly from the part, cap 48 base 49 and the retracted segments moving as a unit.

The operation in assembling the mold elements is just opposite to that described above. The core assembly is moved into position by the hydraulic cylinder 28, first being as shown in FIG. 8 until surface 51 contains the edge of cavity elements 36 and 37. With continued movement of central core element 61 to the left, actuator 64 first begins to move the small segment 44 to its extended position. After a short delay actuator 66 extends large segment 45 to its extended position.

The tooling of my invention can be made in a variety of sizes but I believe that best results will be obtained using a minimum diameter of 6 inches. The rate of movement of the retractable segments is determined by the slope of the actuators 64 and 66. In one example of my invention this was a 20° angle but this can range from 10° to 30°. As the tooling gets larger, the angle can be increased which will, in turn, increase the amount of retraction. The recess can, of course, have various configurations and can be of different widths. In one example of the tooling, the depth of the recess in the plastic part was 0.140 inch.

While I have described the production of a coupling using this molding apparatus, it could be used on longer structures such as pipe. This would, of course, increase the length of the core assembly and would mean a longer withdrawal time. The core assembly can also be used in the field to thermoform plastic pipe originally made as a straight cylinder and wherein a recess or gasket groove is desired in the end of the pipe. This is done by applying heat to a band surrounding the pipe and forcing the apparatus into the pipe and expanding the retractable segments.

The tooling can be used with substantially any plastic used in the production of pipe and fittings. Suitable resins would include high density polyethylene, polypropylene, polystyrene, polyvinyl chloride, etc. I have had especially good results wherein a dense or structural foam product is made using high density polyethylene in the process disclosed by De Vita, U.S. Pat. No. 3,746,494 (1973).

While I have disclosed a particular embodiment of my invention, those skilled in the art will recognize that considerable variations can be made without departing from the broad scope of my invention.

I claim:

1. A collapsible core assembly capable of forming in a hollow plastic part having at least one open end an internal surface containing a 360° recess, said assembly comprising:
   1. a single bi-directional inner core pulling assembly movable axially,
   2. an outer mold means for forming said internal surface comprising:
      a. a first mold means having a first position and a second position, wherein said first mold means when in said first position extends a greater radial distance than said first mold means when in said second position, said first mold means comprising a plurality of first and second mold segments, and
      b. a plurality of grooves being equal in number to and for use with each one of said first and second mold segments and sloping radially inward toward the forward end of said collapsible core assembly, wherein said plurality of grooves are located in one of said first mold means and said inner core pulling assembly, and
   3. a means for coupling said inner core pulling assembly and said first mold means such that axial movement of said inner core pulling assembly causes a radial and coplanar movement of said first mold means between said first and said second positions, wherein there is a substantial time delay after an initial movement from said first position toward said second position by said first mold segments when said second mold segments begin to move from said first position toward said second position, said means for coupling comprising a plurality of projections fixedly attached to the other one of said first mold means and said inner core pulling assembly, and arranged to be slidably contained one in each of said plurality of grooves, wherein the size of grooves, utilized by said means for coupling said first mold segments to said inner core pulling assembly, to the size of said plurality of projections slidably contained therein causes a closely coupled response upon rearward axial movement of said inner core pulling assembly, and the size of grooves, utilized by said means for coupling said second mold segments to said inner core pulling assembly, to said plurality of projections slidably contained therein causes said delay in response upon rearward axial movement of said inner core pulling assembly.

2. The collapsible core assembly of claim 1, wherein each of said first mold segments is radially opposite one of said second mold segments.

3. The collapsible core assembly of claim 1, wherein said first mold segments are smaller than said second mold segments.

4. The collapsible core assembly of claim 1, wherein said outer mold means for forming comprises in addition a second mold means having a suitable radial dimension for forming said at least one open end.

5. The collapsible core assembly of claim 1, wherein said size of grooves, utilized by said means for coupling said second mold segments to said inner core pulling assembly, are such that a surface thereof and a surface of said projections slidably contained therein, which surfaces contact one another to cause movement of said second mold segments from said first position to said second position upon axial movement of said inner core pulling assembly, are spaced apart when said mold means is in said first position and wherein said size of grooves, utilized by said means for coupling said first mold segments to said inner core pulling assembly, are such that a surface thereof and a surface of said projection slidably contained therein, which surfaces contact one another to cause movement of said first mold segments from said first position to said second position upon axial movement of said inner core pulling assembly, are in contact when said mold means is in said first position.

6. A collapsible core assembly capable of forming a 360° recess on the inside diameter of a plastic part having a central portion and a base portion on first and second sides of said recess comprising:
1. an outer assembly adapted to form the inside surface of a said plastic part comprising from front to back in the longitudinal direction:
   a. a forward end cap so shaped as to form the central portion of said plastic part provided with an axial counterbase,
   b. a rearward base so shaped as to form the outer end of said plastic part,
   c. a plurality of radially and coplanarly retractable mold segments positioned between said cap and base which in the molding position provide a mold diameter of greater diameter than adjacent surfaces of said cap and base of said mold sections, the inner ends of said mold segments sloping inwardly toward the center line of the assembly from the base to the cap, said mold segments having a T-shaped keyway on the inner end thereof, said plurality of coplanar mold segments comprising:
      i. three small segments equidistantly placed around the circumference of said plurality, and
      ii. three large segments positioned between said small segments, and
2. a single bidirectional inner core pulling assembly movable axially of said core assembly comprising:
   a. a central core element adapted to travel within an extend rearwardly beyond said counterbase in said cap,
   b. a travel stop on the forward end of said central core element adapted to move within said counterbase between the forward end of the counterbase and the rearward end thereof,
   c. six actuator means fixedly attached to the forward end of said inner core element, sloping radially inwardly toward the center line of the assembly from the rear to the forward ends thereof, each of said actuator means having a T-shaped projection on the radially outer surface thereof adapted to inneract with the T-shaped keyway on the retractable mold segments, said T-shaped keyways in said segments being of two dimensions wherein said actuator means comprises:
      i. first actuator means associated to inneract with said small segments to have the relationship between the projection therein and the keyways on the mold segments such that contact therebetween occurs substantially immediately upon rearward movement of said inner core pulling assembly, and
      ii. second actuator means associated to inneract with said large segments to have the relationship between the projections therein and the keyways on the mold segments such that contact therebetween occurs a substantial time after contact has been made between said first actuators and said small mold segments upon rearward movement of said inner core pulling assembly.

* * * * *

UNITED STATES PATENT OFFICE
CERTIFICATE OF CORRECTION

Patent No. 4,021,180  Dated May 3, 1977

Inventor(s) Wendal I. Smith

It is certified that error appears in the above-identified patent and that said Letters Patent are hereby corrected as shown below:

Column 2 from the ";" of line 28 to the ";" of line 60 should follow the material ending at column 3, line 26.

Column 3, line 18, change "platic" to read -- plastic --.

Column 3, line 61, change "end" first occurrence to read -- and --.

Column 4, line 19, change "lowe" to read -- lower --.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks